(12) United States Patent
Adachi et al.

(10) Patent No.: US 12,479,982 B2
(45) Date of Patent: Nov. 25, 2025

(54) CROSS-LINKED PRODUCT AND TIRE

(71) Applicant: ENEOS MATERIALS CORPORATION, Tokyo (JP)

(72) Inventors: Takumi Adachi, Minato-ku (JP); Yuto Sakagami, Minato-ku (JP); Hirofumi Senga, Minato-ku (JP); Takuya Sano, Minato-ku (JP); Takato Fukumoto, Minato-ku (JP); Michitaka Kaizu, Minato-ku (JP); Toshimitsu Kikuchi, Minato-ku (JP); Toshiyuki Hayakawa, Minato-ku (JP)

(73) Assignee: ENEOS MATERIALS CORPORATION, Tokyo (JP)

( * ) Notice: Subject to any disclaimer, the term of this patent is extended or adjusted under 35 U.S.C. 154(b) by 731 days.

(21) Appl. No.: 17/438,080

(22) PCT Filed: Mar. 30, 2020

(86) PCT No.: PCT/JP2020/014611
§ 371 (c)(1),
(2) Date: Sep. 10, 2021

(87) PCT Pub. No.: WO2020/203984
PCT Pub. Date: Oct. 8, 2020

(65) Prior Publication Data
US 2022/0251351 A1 Aug. 11, 2022

(30) Foreign Application Priority Data
Apr. 1, 2019 (JP) .................................. 2019-070194

(51) Int. Cl.
*C08L 15/00* (2006.01)
*B60C 1/00* (2006.01)
(Continued)

(52) U.S. Cl.
CPC ............ *C08L 15/00* (2013.01); *B60C 1/0016* (2013.01); *B60C 1/0025* (2013.01); *C08C 19/02* (2013.01); *C08C 19/22* (2013.01); *C08C 19/25* (2013.01); *C08F 236/10* (2013.01); *C08J 3/24* (2013.01); *C08K 3/013* (2018.01); *C08K 3/06* (2013.01); *C08K 3/36* (2013.01); *C08L 9/00* (2013.01); *C08L 9/06* (2013.01)

(58) Field of Classification Search
CPC ... C08L 15/00; C08L 9/00; C08L 9/06; C08K 3/06; C08K 3/36; C08K 3/013; C08J 3/24; C08F 236/10; C08C 19/02; C08C 19/22; C08C 19/25; B60C 1/0016; B60C 1/0025
See application file for complete search history.

(56) References Cited

U.S. PATENT DOCUMENTS

2010/0059160 A1\* 3/2010 Sandstrom ............ B60C 1/0016
152/525
2011/0207874 A1\* 8/2011 Ito .......................... C08K 3/36
525/271
(Continued)

FOREIGN PATENT DOCUMENTS

| CN | 106574079 A | 4/2017 |
| CN | 106574097 A | 4/2017 |

(Continued)

OTHER PUBLICATIONS

Machine English translation of JP 2011-508029, Fukasawa et al., Mar. 10, 2011.\*
Machine English translation of WO 2017/086208, Adachi et al., May 26, 2017.\*
Combined Chinese Office Action and Search Report issued Oct. 27, 2022 in Chinese Patent Application No. 202080012760.8 (with unedited computer generated English translation), 19 pages.
Extended European Search Report issued May 20, 2022, in corresponding European Patent Application No. 20781995.4, 7 pages.
Chinese Office Action issued Mar. 28, 2023 in Chinese Patent Application No. 202080012760.8 (with English machine translation), 11 pages.
(Continued)

*Primary Examiner* — Patrick D Niland
(74) *Attorney, Agent, or Firm* — Oblon, McClelland, Maier & Neustadt, L.L.P.

(57) ABSTRACT

A cross-linked product obtained through crosslinking a polymer composition that contains a rubber component, an inorganic filler and a cross-linking agent and that satisfies conditions (a) to (c): (a) the rubber component contains a conjugated diene-based polymer (A) having, when composition ratios (molar ratios) in the conjugated diene-based polymer (A) of structural units represented by formulae (1) to (4) are p, q, r, and s, respectively, a value α represented by formula (i) of 0.80 or more and 0.97 or less;

$$\alpha = (p + (0.5 \times r)) / (p + q + (0.5 \times r) + s) \quad (i)$$

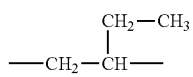

(1)

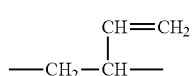

(2)

—CH$_2$—CH$_2$—  (3)

—CH$_2$—CH=CH—CH$_2$—  (4)

(b) a blending ratio of the conjugated diene-based polymer (A) is 10% by mass or more relative to a total amount of the rubber component; and (c) a blending ratio of the inorganic filler is 40 to 150 parts by mass relative to 100 parts by mass of the rubber component, wherein the Tg of the cross-linked product is −25° C. or lower.

20 Claims, No Drawings

(51) Int. Cl.
*C08C 19/02* (2006.01)
*C08C 19/22* (2006.01)
*C08C 19/25* (2006.01)
*C08F 236/10* (2006.01)
*C08J 3/24* (2006.01)
*C08K 3/013* (2018.01)
*C08K 3/06* (2006.01)
*C08K 3/36* (2006.01)
*C08L 9/00* (2006.01)
*C08L 9/06* (2006.01)

(56) References Cited

U.S. PATENT DOCUMENTS

| | | | |
|---|---|---|---|
| 2015/0361210 A1 | 12/2015 | Nosaka et al. | |
| 2015/0368387 A1 | 12/2015 | Nosaka et al. | |
| 2016/0215127 A1 | 7/2016 | Sawada et al. | |
| 2017/0009064 A1* | 1/2017 | Nakamura | C08K 3/04 |
| 2017/0073508 A1* | 3/2017 | Schwekendiek | C08L 9/06 |
| 2017/0129981 A1 | 5/2017 | Oishi et al. | |
| 2017/0226233 A1 | 8/2017 | Yamashiro et al. | |
| 2018/0142089 A1 | 5/2018 | Yamashiro | |
| 2018/0251576 A1 | 9/2018 | Adachi et al. | |
| 2019/0010313 A1 | 1/2019 | Yamashiro et al. | |

FOREIGN PATENT DOCUMENTS

| | | | | |
|---|---|---|---|---|
| CN | 107683293 A | | 2/2018 | |
| EP | 1160299 A1 | * | 12/2001 | C09D 133/064 |
| EP | 3 747 943 A1 | | 12/2020 | |
| JP | 63-4841 B2 | | 2/1988 | |
| JP | 1-37970 B2 | | 8/1989 | |
| JP | 11-349628 A | | 12/1999 | |
| JP | 2011508029 A | * | 3/2011 | |
| JP | 2017-52874 A | | 3/2017 | |
| JP | 2018-83884 A | | 5/2018 | |
| JP | 2018-111780 A | | 7/2018 | |
| JP | 2019-14796 A | | 1/2019 | |
| WO | WO 2014/133097 A1 | | 9/2014 | |
| WO | WO 2015/064646 A1 | | 5/2015 | |
| WO | WO 2015/190073 A1 | | 12/2015 | |
| WO | WO 2016/039005 A1 | | 3/2016 | |
| WO | WO 2017/086208 A1 | | 5/2017 | |

OTHER PUBLICATIONS

Japanese Office Action issued Feb. 13, 2024 in Japanese Patent Application No. 2021-512125 (with unedited computer generated English translation), 11 pages.

Japanese Office Action issued Nov. 14, 2023 in Japanese Application 2021-512125, (with unedited computer-generated English translation), 15 pages.

International Search Report issued on Jun. 23, 2020 in PCT/JP2020/014611 filed Mar. 30, 2020, 3 pages.

Combined Taiwanese Office Action issued Aug. 7, 2024 in Taiwanese Patent Application No. 109110733 (with unedited, machine-generated English translation), 10 pages.

* cited by examiner

CROSS-LINKED PRODUCT AND TIRE

CROSS-REFERENCE TO RELATED APPLICATIONS

The present application is the national stage of international application PCT/JP2020/014611, filed on Mar. 30, 2020, and claims the benefit of the filing date of Japanese Patent Application No. 2019-70194, filed Apr. 1, 2019, the contents of each of which are incorporated herein by reference in their entirety.

TECHNICAL FIELD

This disclosure relates to a cross-linked product and a tire.

BACKGROUND ART

Conjugated diene-based polymers (for example, styrene-butadiene copolymers) exhibit various good properties, such as thermal resistance, wear resistance, mechanical strength, and molding processability, and thus have been widely used in various industrial products, such as pneumatic tires, anti-vibration rubber, and hoses. Further, conventionally, it has been proposed to obtain a vulcanized rubber having high strength and low wear by using a hydrogenated conjugated diene-based polymer in which a part of the unsaturated bonds of the conjugated diene-based polymer are hydrogenated (for example, International Publication No. 2015/064646).

PRIOR ART DOCUMENTS

Patent Documents

Patent Document 1: WO 2015/064646

SUMMARY OF INVENTION

Technical Problem

Conventional vulcanized rubbers produced using a highly saturated conjugated diene-based polymer may not have sufficient flexibility at low temperature, limiting their use to applications that are expected to be used in low temperature environments.

This disclosure has been made in view of the problem described above, and a main object of this disclosure is to provide a cross-linked product having high strength and excellent low temperature properties.

Solution to Problem

As a result of diligent studies to solve the above-described problem in the prior art, the present inventors discovered that the problem could be solved by crosslinking a polymer composition including a highly saturated conjugated diene-based polymer, an inorganic filler, and a cross-linking agent in a predetermined ratio to obtain a cross-linked product that exhibited predetermined properties. Specifically, the following means are provided by this disclosure.

[1] A cross-linked product obtained through crosslinking of a polymer composition that contains a rubber component, an inorganic filler and a cross-linking agent and that satisfies the following conditions (a) to (d):
 (a) the polymer composition contains, as the rubber component, a conjugated diene-based polymer (A) having, when composition ratios (molar ratios) in the polymer of a structural unit represented by formula (1), a structural unit represented by formula (2), a structural unit represented by formula (3), and a structural unit represented by formula (4) are p, q, r, and s, respectively, a value α represented by formula (i) of 0.80 or more and 0.97 or less;

$$\alpha = (p+(0.5 \times r))/(p+q+(0.5 \times r)+s) \qquad (i)$$

(b) the conjugated diene-based polymer (A) has a blending ratio of 10% by mass or more relative to a total amount of the rubber component;
 (c) the inorganic filler has a blending ratio of 40 to 150 parts by mass relative to 100 parts by mass of the rubber component; and
 (d) the cross-linked product has a glass transition point (Tg) of −25° C. or lower.

[F1]

[2] A method for producing a cross-linked product, the method including crosslinking a polymer composition that contains a rubber component, an inorganic filler and a cross-linking agent and that satisfies the above conditions (a) to (d).
[3] An all-season tire having one or both of a tread and a sidewall formed by the cross-linked product of [1].
[4] A winter tire having one or both of a tread and a sidewall formed by the cross-linked product of [1].
[5] A rubber molded product formed by the cross-linked product of [1], wherein the rubber molded product is an anti-vibration member, a belt member, a roll member, a hose member, a wire harness member, or a shoe sole member.

Advantageous Effects of Invention

According to this disclosure, it is possible to obtain a cross-linked product that has a high strength and excellent low temperature properties (in particular, flexibility at low temperature).

DESCRIPTION OF EMBODIMENTS

The matters relating to the implementation of this disclosure will be described in detail below. A cross-linked product of this disclosure is obtained by crosslinking a polymer composition that contains a rubber component, an inorganic filler and a cross-linking agent. As used herein, the term "rubber component" included in the polymer composition means a polymer capable of obtaining a cured product that exhibits rubber elasticity by thermosetting. At room temperature, this cured product exhibits properties of undergoing a large deformation by a small force (for example, a two-fold deformation or more when stretched at room temperature), and rapidly returning to almost its original shape when the force is removed. The term "vulcanized rubber" refers to a cured product obtained by thermosetting a rubber component.

Polymer Composition

Rubber Component

The polymer composition according to this disclosure contains, as a rubber component, a conjugated diene-based polymer (A) having, when composition ratios (molar ratios) in the polymer of a structural unit represented by formula (1), a structural unit represented by formula (2), a structural unit represented by formula (3), and a structural unit represented by formula (4) are p, q, r, and s, respectively, a value α represented by formula (i) of 0.80 or more and 0.97 or less.

$$\alpha=(p+(0.5\times r))/(p+q+(0.5\times r)+s) \quad (i)$$

[F2]

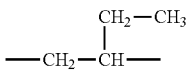

(1)

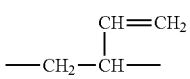

(2)

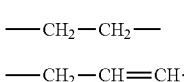

(3)

(4)

The polymer (A) can be produced by a method including, for example, a step of polymerizing a monomer containing a conjugated diene compound to obtain a conjugated diene-based polymer having an active terminal (polymerization step), and a step of hydrogenating the conjugated diene-based polymer (hydrogenation step). Further, the method may optionally include a step of modifying the conjugated diene-based polymer obtained by the polymerization step (modification step). Specifically, the polymer (A) can be produced by appropriately changing, in accordance with the method described in International Publication No. 2014/133097, the molecular weight, the aromatic vinyl compound amount, the vinyl bond content, the hydrogenation ratio, the type of modifier, and the like to match the purpose of use. In addition, the polymer (A) can also be produced by copolymerizing a diene monomer such as 1,3-butadiene with a non-conjugated olefin in accordance with the method described in International Publication No. 2015/190073. The polymer (A) and a method for producing the polymer (A) will now be described in detail, taking a hydrogenated conjugated diene-based polymer as an example.

(Polymerization Step)

In the polymerization, as the conjugated diene compound, 1,3-butadiene can be preferably used. Further, in the polymerization, a conjugated diene compound other than 1,3-butadiene may be used in addition to 1,3-butadiene. Specific examples of the conjugated diene compound other than 1,3-butadiene include isoprene, 2,3-dimethyl-1,3-butadiene, and 1,3-pentadiene. Among these, isoprene is preferable as the conjugated diene compound other than 1,3-butadiene. One type of the conjugated diene compound may be used alone, or two or more types may be used in combination.

The polymer (A) may be a homopolymer that uses a conjugated diene compound. From the viewpoint of increasing the strength of the cross-linked product, the polymer (A) is preferably a copolymer of a conjugated diene compound and an aromatic vinyl compound. Examples of the aromatic vinyl compound used for the polymerization include styrene, 2-methylstyrene, 3-methylstyrene, 4-methylstyrene, α-methylstyrene, N,N-dimethylaminoethylstyrene, and diphenylethylene. Among these, the aromatic vinyl compound is particularly preferably one or more compounds selected from styrene and α-methylstyrene. One type of the aromatic vinyl compound can be used alone, or two or more types may be used in combination.

When the polymer (A) is a copolymer of a conjugated diene compound and an aromatic vinyl compound, from the viewpoint of having high living properties in anionic polymerization, the polymer (A) is preferably, among these, a copolymer of 1,3-butadiene and styrene. From the viewpoint that filler dispersibility can be further improved, the polymer (A) is preferably a random copolymer having an irregular distribution of the conjugated diene compound and the aromatic vinyl compound. The random copolymer of the conjugated diene compound and the aromatic vinyl compound may further have a block moiety composed of the conjugated diene compound or the aromatic vinyl compound, as long as the effects of this disclosure can be obtained.

In the copolymer of the conjugated diene compound and the aromatic vinyl compound, from the viewpoint of improving the low temperature properties (specifically, flexibility at low temperature) and low hysteresis loss properties of the cross-linked product, the amount of the aromatic vinyl compound used is preferably 3 to 33% by mass relative to the total amount of the monomers used for the polymerization. The amount of the aromatic vinyl compound used is more preferably 4% by mass or more, and further preferably 5% by mass or more, relative to the total amount of the monomers used for the polymerization. The amount of the aromatic vinyl compound used is more preferably 30% by mass or less, and further preferably 25% by mass or less, relative to the total amount of the monomers used for the polymerization. By keeping the content of the aromatic vinyl compound within the above range, both productivity and strength can be achieved. The monomers used in the production of the polymer (A) preferably include 50 to 97 parts by mass of 1,3-butadiene, 3 to 33 parts by mass of the aromatic vinyl compound, and 0 to 30 parts by mass of a conjugated diene compound other than 1,3-butadiene relative to 100 parts by mass of the total amount of the monomers used in the polymerization. Using such a blended amount is preferable in terms of enabling a good balance between the strength of the cross-linked product and the low temperature properties to be maintained.

The conjugated diene compounds and the aromatic vinyl compounds mentioned as examples above all have the same action in that a conjugated diene-based polymer having an active terminal can be obtained. Therefore, even those compounds not described in the Examples described later can be used in this disclosure.

In the polymerization, a monomer other than the conjugated diene compound and the aromatic vinyl compound (another monomer) may be used. Examples of another monomer include acrylonitrile, methyl (meth)acrylate, and ethyl (meth)acrylate. The proportion of another monomer used is, relative to the total amount of the monomers used for the polymerization, preferably 30% by mass or less, more preferably 20% by mass or less, and further preferably 10% by mass or less.

As the polymerization method for obtaining the polymer (A), any of a solution polymerization method, a gas phase polymerization method, and a bulk polymerization method may be used. In particular, a solution polymerization method is preferred. As the polymerization type, either a batch type or a continuous type may be used. When a solution polymerization method is used, an example of a specific polymerization method is a method in which polymerization is conducted with a monomer including the conjugated diene compound in an organic solvent in the presence of a polymerization initiator and, optionally, a randomizer.

As the polymerization initiator, at least one of an alkali metal compound and an alkaline earth metal compound can be used. As the alkali metal compound and the alkaline earth metal compound, those usually used as an initiator in anionic polymerization can be used. Specific examples of the polymerization initiator include alkyllithiums such as methyllithium, ethyllithium, n-propyllithium, n-butyllithium, sec-butyllithium, and t-butyllithium; 1,4-dilithiobutane, phenyllithium, stillbenlithium, naphthyllithium, sodium naphthyl, potassium naphthyl, di-n-butylmagnesium, di-n-hexylmagnesium, ethoxypotassium, and calcium stearate. Among these, a lithium compound can be preferably used as the polymerization initiator.

The polymerization reaction may be carried out in the presence of a compound (hereinafter, also referred to as "compound (R)") obtained by mixing at least one of the above-described alkali metal compound and alkaline earth metal compound with a compound having a functional group that interacts with the inorganic filler (hereinafter, also referred to as "compound (C1)"). By carrying out the polymerization in the presence of the compound (R), a functional group that interacts with the inorganic filler can be introduced into the polymerization initiation terminal of the polymer (A). Further, as the polymer (A), using a polymer having a modified initiation terminal is preferable in that the low hysteresis loss performance of the vulcanized rubber can be improved.

As used herein, the term "interaction" means that a covalent bond is formed between molecules, or an intermolecular force (e.g., an intermolecular electromagnetic force such as ion-dipole interaction, dipole-dipole interaction, a hydrogen bond, or Van der Waals force) that is weaker than a covalent bond is formed. Further, the phrase "functional group that interacts with the inorganic filler" means a group that has at least one atom that interacts with the inorganic filler. When the polymer composition contains silica as the inorganic filler, the polymer (A) preferably has a functional group that interacts with silica. The phrase "functional group that interacts with silica" means a group having at least one atom that interacts with silica, such as a nitrogen atom, a sulfur atom, a phosphorus atom, an oxygen atom, or silicon atom. However, the silicon atom possessed by the "functional group that interacts with silica" is the silicon atom in the hydrocarbyloxysilyl group.

The compound (C1) is preferably a nitrogen-containing compound such as a secondary amine compound. The compound (R) is especially preferably a reaction product of a lithium compound, such as alkyllithium, and the nitrogen-containing compound such as a secondary amine compound. Examples of the nitrogen-containing compound as the compound (C1) include dimethylamine, diethylamine, dipropylamine, dibutylamine, dodecamethyleneimine, N,N'-dimethyl-N'-trimethylsilyl-1,6-diaminohexane, piperidine, pyrrolidine, hexamethyleneimine, heptamethyleneimine, dicyclohexylamine, N-methylbenzylamine, di-(2-ethylhexyl)amine, diallylamine, morpholin, N-(trimethylsilyl) piperazine, N-(tert-butyldimethylsilyl)piperazine, and 1,3-ditrimethylsilyl-1,3,5-triaz inane.

In the case of carrying out the polymerization in the presence of the compound (R), the compound (R) may be prepared by mixing the alkali metal compound or alkaline earth metal compound and the compound (C1) in advance, and the polymerization carried out by adding the prepared compound (R) to the polymerization system. Alternatively, the polymerization may be carried out by adding the alkali metal compound or alkaline earth metal compound and the compound (C1) to the polymerization system and mixing them in the polymerization system to prepare the compound (R).

The randomizer may be used to adjust the vinyl bond content (i.e., the amount of 1,2-vinyl bonds) in the polymer obtained by the above polymerization. Examples of the randomizer include dimethoxybenzene, tetrahydrofuran, dimethoxyethane, diethylene glycol dibutyl ether, diethylene glycol dimethyl ether, 2,2-di(tetrahydrofuryl)propane, 2-(2-ethoxyethoxy)-2-methylpropane, triethylamine, pyridine, N-methylmorpholine, and tetramethylethylenediamine. One type of the randomizer may be used alone, or two or more types may be used in combination.

The organic solvent used for polymerization may be an organic solvent that is inert to the reaction. For example, aliphatic hydrocarbons, alicyclic hydrocarbons, and aromatic hydrocarbons can be used. Of these, the organic solvent is preferably a hydrocarbon having 3 to 8 carbon atoms. Specific examples of the hydrocarbon having 3 to 8 carbon atoms include n-pentane, isopentane, n-hexane, cyclohexane, propene, 1-butene, isobutene, trans-2-butene, cis-2-butene, 1-pentyne, 2-pentyne, 1-hexene, 2-hexene, benzene, toluene, xylene, ethylbenzene, heptane, cyclopentane, methylcyclopentane, methylcyclohexane, 1-pentene, 2-pentene, and cyclohexene. These organic solvents may be used either alone or in combination of two or more.

When using the solution polymerization method, the monomer concentration in the reaction solvent is preferably 5 to 50% by mass, and more preferably 10 to 30% by mass, since such a monomer concentration enables a balance to be maintained between productivity and polymerization controllability. The polymerization reaction temperature is preferably −20° C. to 150° C., more preferably 0 to 120° C., and particularly preferably 20 to 100° C. It is preferable to carry out the polymerization reaction under a pressure sufficient to substantially maintain the monomer to be in a liquid phase. Such a pressure may be achieved by a method for pressurizing the inside of the reaction vessel using gas that is inert to the polymerization reaction, for example.

The 1,2-vinyl content (vinyl bond content) of the conjugated diene-based polymer obtained by the above polymerization is preferably 5 to 70 mol %, more preferably 10 to 60 mol %, and further preferably 15 to 50 mol %. When the vinyl bond content is 5 mol % or more, the grip properties tend to be good, and when it is 70 mol % or less, good wear resistance tends to be exhibited. The vinyl bond content is a value measured by a $^1$H-NMR.

(Modification Step)

The modification step is a step in which the active terminal of the conjugated diene-based polymer obtained by the polymerization step is reacted with a compound having a functional group that interacts with the inorganic filler (hereinafter, also referred to as "compound (C2)"). As a result of this step, a functional group that interacts with the inorganic filler can be introduced into the polymerization-end terminal of the polymer (A). This is preferable because a cross-linked product having excellent low hysteresis loss performance can be obtained. As used herein, the term "active terminal" means a portion (more specifically, a metal terminal) other than the structure derived from the monomer having a carbon-carbon double bond, which is present at the end of the molecular chain.

In this step, the conjugated diene-based polymer used for the reaction with the compound (C2) may be a polymer having an unmodified polymerization initiation terminal or a polymer modified by the compound (C1), as long as the conjugated diene-based polymer has an active terminal. The compound (C2) is not particularly limited as long as it is a compound capable of reacting with the active terminal of the conjugated diene-based polymer. The compound (C2) is preferably a compound having one atom selected from the group consisting of a nitrogen atom, a sulfur atom, a phosphorus atom, an oxygen atom, and a silicon atom, and having no active hydrogens bonded to that atom. In particular, the compound (C2) is preferably a compound having one or more functional groups selected from the group consisting of an amino group, a group having a carbon-nitrogen double bond, a nitrogen-containing heterocyclic group, a phosphino group, a cyclic ether group, a cyclic thioether group, a protected hydroxyl group, a protected thiol group, and a hydrocarbyloxysilyl group (hereinafter, also referred to as "specific functional group"). Here, the amino group is preferably a protected primary or secondary amino group, or a tertiary amino group. Using a polymer having the specific functional group at a terminal as the polymer (A) is preferable in that a cross-linked product having excellent low hysteresis loss performance can be obtained.

Specific examples of the compound (C2) include each of the following compounds (I) to (IV).

(I) A compound (B-1) represented by formula (5):

[F3]

(5)

wherein $A^1$ has at least one atom selected from the group consisting of nitrogen, phosphorus, oxygen, sulfur, and silicon, has no active hydrogens, and is a monovalent functional group bonded to $R^5$ by a nitrogen atom, a phosphorus atom, an oxygen atom, a sulfur atom, a silicon atom, or a carbon atom included in a carbonyl group, or is a (thio)epoxy group; $R^3$ and $R^4$ are hydrocarbyl groups; $R^5$ is a hydrocarbylene group; and r is an integer of 0 to 2; however, when a plurality of $R^3$ and $R^4$ are present, the plurality of $R^3$ and $R^4$ may be the same group or different groups, respectively.

(II) A compound (B-2) represented by formula (6):

[F4]

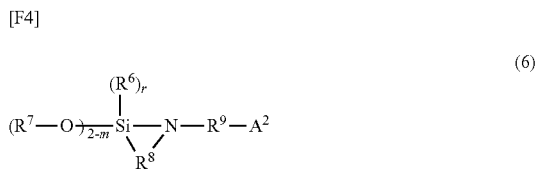

(6)

wherein $A^2$ has at least one atom selected from the group consisting of nitrogen, phosphorus, oxygen, sulfur, and silicon, has no active hydrogens, and is a monovalent functional group bonded to $R^9$ by a nitrogen atom, a phosphorus atom, an oxygen atom, a sulfur atom, or a silicon atom, or is a hydrocarbyl group having 1 to 20 carbon atoms; $R^6$ and $R^7$ are each independently a hydrocarbyl group; $R^8$ is a hydrocarbylene group; $R^9$ is a single bond or a hydrocarbylene group; and m is 0 or 1; however, when a plurality of $R^7$ are present, the plurality of $R^7$ may be the same group or different groups, respectively.

(III) A compound (B-3) having one or more of a functional group P, which is at least one selected from the group consisting of a cyclic ether group, a (thio)carbonyl group and an iso(thio)cyanato group in a molecule, and a group Q different from the functional group P, which has at least one atom selected from the group consisting of a nitrogen atom, a phosphorus atom, an oxygen atom and a sulfur atom (provided that at least one of the nitrogen atom, the phosphorus atom, and the sulfur atom is protected by a trisubstituted hydrocarbylsilyl group) and does not have an active hydrogen.

(IV) A compound (B-4) having two or more iso(thio) cyanate groups in a molecule.

In formulas (5) and (6), the hydrocarbyl groups of $R^3$, $R^4$, $R^6$, and $R^7$ are preferably a linear or branched alkyl group having 1 to 20 carbon atoms, a cycloalkyl group having 3 to 20 carbon atoms, or an aryl group having 6 to 20 carbon atoms.

The hydrocarbylene groups of $R^5$ and $R^9$ are preferably a linear or branched alkanediyl group having 1 to 20 carbon atoms, a cycloalkylene group having 3 to 20 carbon atoms, or an arylene group having 6 to 20 carbon atoms.

From the viewpoint of increasing the reactivity with the conjugated diene-based polymer, r and m are preferably 0 or 1.

It is preferable that the at least one atom selected from the group consisting of nitrogen, phosphorus, oxygen, sulfur, and silicon possessed by $A^1$ when $A^1$ is the monovalent functional group, and the at least one atom selected from the group consisting of nitrogen, phosphorus, oxygen, sulfur, and silicon possessed by $A^2$ are not bonded to an active hydrogen, and are protected by a protective group (for example, a trisubstituted hydrocarbylsilyl group). As used herein, the term "active hydrogen" refers to a hydrogen atom bonded to an atom other than a carbon atom, and preferably has a lower binding energy than the carbon-hydrogen bond of polymethylene. The term "protective group" means a functional group that converts $A^1$ and $A^2$ into a functional group that is inactive relative to the polymerization active terminal. The term "(thio)epoxy group" includes an epoxy group and a thioepoxy group.

$A^1$ may be a group that can be turned into an onium ion by an onium salt producing agent. Specific examples of $A^1$ include a nitrogen-containing group in which two hydrogen atoms of a primary amino group are substituted with two protective groups, a nitrogen-containing group in which one hydrogen atom of a secondary amino group is substituted with one protective group, a phosphorus-containing group in which two hydrogen atoms of a tertiary amino group, an imino group, a pyridyl group, or a primary phosphino group are substituted with two protective groups, a phosphorus-containing group in which one hydrogen atom of a secondary phosphino group is substituted with one protective group, a group in which a hydrogen atom of a tertiary phosphino group, an epoxy group, or a hydroxyl group is protected by a protective group, a sulfur-containing group in which a hydrogen atom of a thioepoxy group or a thiol group is substituted with a protective group, and a hydrocarbyloxycarbonyl group. Of these, $A^1$ is preferably a group having a nitrogen atom in that affinity with silica is good, and more preferably is a group containing a nitrogen-containing group in which one hydrogen atom of a tertiary amino group or a secondary amino group is substituted with one protective group, or a nitrogen-containing group in which two hydrogen atoms of a primary amino group are substituted with two protective groups.

Specific examples of the compound (B-1) include, for example, N,N-bis(trimethylsilyl)aminopropyltrimethoxysilane, N,N-bis(trimethylsilyl)aminopropylmethyldiethoxysilane, N,N-dimethyl-3-(trimethoxysilyl)propylamine, N,N-dimethyl-3-(triethoxysilyl)propylamine, N,N',N'-tris(trimethylsilyl)-N-(2-aminoethyl)-3-aminopropyltriethoxysilane, 3-(4-trimethylsilyl-1-piperazino)propylmethyldimethoxysilane, 3-glycidoxypropylmethyldimethoxysilane, 3-glycidoxypropyltriethoxysilane, and the like.

Specific examples of the compound (B-2) include, for example, 2,2-dimethoxy-1-(3-trimethoxysilylpropyl)-1,2-azacilolidine, 2,2-diethoxy-1-(3-trimethoxysilylpropyl)-1,2-azacilolidine, 2,2-dimethoxy-1-phenyl-1,2-azacilolidine, 1-trimethylsilyl-2,2-dimethoxy-1-aza-2-silacyclopentane, 2-(2,2-dimethoxy-1,2-azacilolidine-1-yl)-N,N-diethyl-ethane-1-amine, 2-(2,2-dimethoxy-1,2-azacilolidine-1-yl)-N,N-dimethylethane-1-amine, and 3-(2,2-dimethoxy-1,2-azacilolidine-1-yl)-N,N-diethylpropane-1-amine.

The compound (B-3) is preferably a group in which the group Q includes a nitrogen atom that is not bonded to an active hydrogen. Specific examples of the compound (B-3) include: as a compound having a cyclic ether group, for example, an epoxyamine compound such as tetraglycidyl-1,3-bisaminomethylcyclohexane; as a compound having a (thio)carbonyl group, for example, a 4-aminoacetophenone such as 4-N,N-dimethylaminobenzophenone; a bis(dihydrocarbylaminoalkyl) ketone such as 1,7-bis(methylethylamino)-4-heptanone; a dihydrocarbylaminoalkyl (meth)acrylate such as 2-dimethylaminoethyl acrylate; a hydrocarbyl imidazolidinone such as 1,3-dimethyl-2-imidazolidinone; an N-hydrocarbylpyrrolidone such as 1-phenyl-2-pyrrolidone; an N-hydrocarbylcaptoractam such as N-methyl-ε-caprolactam; an N-dihydrocarbylformamide such as N,N-diethylformamide; an N,N-dihydrocarbylacetamide such as N,N-dimethylacetamide; a (meth)acrylamide such as N,N-dimethylacrylamide; and as a compound having an iso(thio)cyanato group, for example, 3-isocyanatopropyltrimethoxysilane.

Examples of the compound (B-4) include 2,4-tolylene diisocyanate, 2,6-tolylene diisocyanate, diphenylmethane diisocyanate, naphthalene diisocyanate, triphenylmethane triisocyanate, p-phenylene diisocyanate, tris(isocyanatephenyl)thiophosphate, xylene diisocyanate, benzene-1,2,4-triisocyanate, naphthalene-1,2,5,7-tetraisocyanate, and 1,4-phenylenediisocyanate.

As the compound (C2), it is preferable to use at least one selected from the group consisting of the compound (B-1) and the compound (B-2) in particular, in that the affinity with silica is strong, and more preferable to use the compound (B-1). One type of the compound (C2) may be used alone, or two or more types may be used in combination.

The above-mentioned terminal modification reaction can be carried out as, for example, a solution reaction. This solution reaction may be carried out using a solution including an unreacted monomer after the completion of the polymerization reaction in the polymerization step, and may also be carried out after the conjugated diene-based polymer included in the solution is isolated and dissolved in an appropriate solvent such as cyclohexane. Further, the terminal modification reaction may be carried out as either a batch type or a continuous type. At this time, the method of adding the compound (C2) is not particularly limited, and examples thereof include a method of adding the compound (C2) all at once, a method of dividedly adding the compound (C2), and a method of continuously adding the compound (C2).

The amount of the compound (C2) to be used in the terminal modification reaction may be appropriately set according to the type of the compound used in the reaction. The amount of the compound (C2) is preferably 0.1 molar equivalent or more, and more preferably 0.3 molar equivalents or more, relative to the metal atom of the polymerization initiator involved in the polymerization reaction. By setting the amount of the compound (C2) used to 0.1 molar equivalent or more, the modification reaction can be sufficiently promoted, and the dispersibility of the silica can be suitably improved. The temperature of the terminal modification reaction is usually the same as the temperature of the polymerization reaction, preferably −20 to 150° C., more preferably 0 to 120° C., and particularly preferably 20 to 100° C. When the temperature of the modification reaction is low, the viscosity of the modified conjugated diene-based polymer solution tends to increase. On the other hand, when the temperature of the modification reaction is high, the polymerization active terminal tends to become deactivated. The reaction time of the modification reaction is preferably 1 minute to 5 hours, and more preferably 2 minutes to 1 hour.

For the purpose of adjusting the Mooney viscosity of the polymer (A), a coupling agent such as silicon tetrachloride or a polyfunctional epoxy compound (for example, tetraglycidyl-1,3-bisaminomethylcyclohexane and the like) may be reacted with a conjugated diene-based polymer having an active terminal before or after the modification reaction using the compound (C2), or at the same time as the modification reaction by the compound (C2). The ratio of the coupling agent used can be appropriately set according to the desired Mooney viscosity of the polymer (A), the compound used in the reaction, and the like. The ratio of the coupling agent used is preferably 0.01 to 0.8 molar equivalents relative to the metal atom of the polymerization initiator involved in the polymerization reaction. One type of the coupling agent may be used alone, or two or more types may be used in combination.

(Hydrogenation Step)

The polymer (A) can be obtained by hydrogenating the above-obtained modified or unmodified conjugated diene-based polymer. The hydrogenation reaction can be performed by any methods under any conditions, so long as a conjugated diene-based polymer having the desired hydrogenation ratio is obtained. Examples of those hydrogenation methods include a method involving the use of a catalyst containing an organometallic compound of titanium as a main component of a hydrogenation catalyst; a method involving the use of a catalyst containing an organic compound of iron, nickel, or cobalt and an organometallic compound such as an alkylaluminum; a method involving the use of an organic complex of an organometallic compound of, for example, ruthenium or rhodium; and a method involving the use of a catalyst including a carrier (e.g., carbon, silica, or alumina) on which a metal such as palladium, platinum, ruthenium, cobalt, or nickel is supported, and the like. Among the various methods, a method in which hydrogenation is carried out under mild conditions of low pressure and low temperature conditions using an organometallic compound of titanium alone, or a uniform catalyst composed of an organometallic compound of titanium and an organometallic compound of lithium, magnesium, and aluminum (Japanese Patent Publication No. 63-4841 and Japanese Patent Publication No. 1-37970) is industrially preferable, hydrogenation selectivity for the double bond of butadiene is also high, and is suitable for the purpose of this disclosure.

The hydrogenation of the modified conjugated diene-based polymer obtained by the above modification step is carried out using a solvent that is inert to the catalyst and in which the conjugated diene-based polymer is soluble. Preferred solvents include aliphatic hydrocarbons such as n-pentane, n-hexane, and n-octane, alicyclic hydrocarbons such as cyclohexane and cycloheptane, aromatic hydrocarbons such as benzene and toluene, and ethers such as diethyl ether and tetrahydrofuran, which are used alone or as a mixture in which these solvents are a main component.

The hydrogenation reaction is generally carried out by holding the conjugated diene-based polymer at a predetermined temperature under a hydrogen or an inert atmosphere, adding a hydrogenation catalyst under stirring or non-stirring, and then increasing the pressure to a predetermined pressure by introducing hydrogen gas. The term "inert atmosphere" means an atmosphere that does not react with the substances involved in the hydrogenation reaction, and examples thereof include helium, neon, and argon. Air and oxygen are not preferable because they oxidize the catalyst and cause the catalyst to be deactivated. In addition, nitrogen is not preferable because it acts as a catalytic poison during the hydrogenation reaction and reduces the hydrogenation activity. In particular, it is most preferable that the hydrogenation reaction vessel has an atmosphere of hydrogen gas alone.

The hydrogenation reaction process for obtaining a hydrogenated conjugated diene-based polymer can be a batch process, a continuous process, or a combination thereof. When a titanocene diaryl compound is used as the hydrogenation catalyst, the titanocene diaryl compound may be added alone to the reaction solution as is, or may be added as a solution in an inert organic solvent. As the inert organic solvent used when the catalyst is used as a solution, various solvents that do not react with the substances involved in the hydrogenation reaction can be used. The inert organic solvent is preferably the same solvent as the solvent used for the hydrogenation reaction. A preferable added amount of the catalyst is 0.02 to 20 mmol per 100 g of conjugated diene-based polymer before hydrogenation.

The polymer (A) has a value α specified by formula (i) of 0.80 or more and 0.97 or less:

$$\alpha = (p + (0.5 \times r))/(p + q + (0.5 \times r) + s) \quad (i)$$

(in which p, q, r, and s represent a composition ratio (molar ratio) in the polymer of the structural units represented by the above formulas (1) to (4), respectively). By setting α to 0.80 or more, a cross-linked product having sufficiently high strength can be obtained. Further, this is also preferable in that the cross-linked product can have excellent ozone resistance. For these reasons, α is preferably 0.82 or more, more preferably 0.85 or more, and further preferably 0.88 or more. Moreover, α is preferably 0.96 or less from the viewpoint of sufficiently ensuring the low hysteresis loss properties of the cross-linked product.

The value α defined by the above formula (i) corresponds to the hydrogenation ratio of the polymer (A). For example, when α is 0.80, the hydrogenation ratio of the polymer (A) is 80%. The hydrogenation ratio of the polymer (A) can be adjusted based on the duration of the hydrogenation reaction and the like. The hydrogenation ratio can be measured by a $^1$H-NMR. When the polymer (A) is a polymer obtained by copolymerizing a diene monomer and a non-conjugated olefin, the value of a can be adjusted by changing the ratio of the monomers to be copolymerized.

In a preferable method of obtaining the polymer (A), a monomer including butadiene is subjected to solution polymerization in the presence of an alkali metal compound, the modification step is carried out using the obtained polymer solution as it is, and then the hydrogenation step is carried out. Such a method is industrially useful. In this case, the polymer (A) is isolated from the obtained solution through removal of the solvent therefrom. The polymer can be isolated by a known desolvation method, such as steam stripping, and then performing a drying operation, such as a heat treatment.

The polymer (A) has a weight average molecular weight (Mw) of preferably $1.0 \times 10^5$ to $2.0 \times 10^6$. If the Mw is less than $1.0 \times 10^5$, the wear resistance and fuel efficiency of the obtained cross-linked product may decrease, and if it is more than $2.0 \times 10^6$, workability tends to deteriorate. The Mw of the polymer (A) is more preferably $1.0 \times 10^5$ or more, and further preferably $1.2 \times 10^5$ or more. The Mw of the polymer (A) is more preferably $1.5 \times 10^6$ or less, and further preferably $1.5 \times 10^6$ or less. As used herein, the weight average molecular weight is a value in terms of polystyrene measured by gel permeation chromatography (GPC).

From the viewpoint of obtaining a cross-linked product that exhibits excellent material strength and flexibility at low temperature, the polymer (A) preferably has a glass transition point (Tg) of −25° C. or lower. The glass transition point of the polymer (A) is more preferably −30° C. or lower, further preferably −40° C. or lower, even further preferably −45° C. or lower, and particularly preferably −50° C. or lower. Further, the glass transition point of the polymer (A) is, for example, −70° C. or higher. The glass transition point of the polymer is a value measured by differential scanning calorimetry (DSC) in accordance with ASTM D3418.

From the viewpoint of ensuring the green strength of the polymer composition, the polymer (A) preferably has a heat of fusion (ΔH) of 3 J/g or more. The heat of fusion of the polymer (A) is more preferably 5 J/g or more, further preferably 10 J/g or more, and particularly preferably 15 J/g or more. In this specification, the heat of fusion of the polymer (A) is a value measured by differential scanning calorimetry (DSC method). Specifically, the heat of fusion is an integrated value of the change in the heat flow rate when, using a differential scanning calorimeter (DSC), the sample polymer is held at 180° C. for 1 minute, cooled to −100° C. at a rate of 10° C./min, then held at −100° C. for 1 minute, and then the temperature is raised to 200° C. at a rate of 20° C./min.

From the viewpoint of ensuring the green strength of the polymer composition, the polymer (A) preferably has a melting point (Tm) of −10° C. or higher. The melting point of the polymer (A) is more preferably 0° C. or higher, further preferably 5° C. or higher, and particularly preferably 10° C. or higher. In this specification, the melting point of the polymer (A) is a value measured by a DSC method. Specifically, the melting point of the polymer (A) is the peak temperature of the heat flow when, using DSC, the sample polymer is held at 180° C. for 1 minute, cooled to −100° C. at a rate of 10° C./min, then held at −100° C. for 1 minute, and then the temperature is raised to 200° C. at a rate of 20° C./min.

In particular, when the melting point (Tm) of the polymer (A) is −10° C. or higher and the heat of fusion (ΔH) is 3 J/g or more, this is preferable because the green strength of the polymer composition can be further increased, and the design properties of the rubber molded product can be enhanced.

The blending ratio of the polymer (A) is 10% by mass or more relative to the total amount of the rubber components blended in the polymer composition. When the blending ratio of the polymer (A) is less than 10% by mass, the strength of the obtained cross-linked product is insufficient and the low temperature properties are worse. For this reason, the blending ratio of the polymer (A) is preferably 20% by mass or more, more preferably 50% by mass or more, and further preferably 70% by mass or more, relative to the total amount of the rubber components blended in the polymer composition. One type of the polymer (A) may be used alone, or two or more types may be used in combination.

The polymer composition may contain only the polymer (A) as the rubber component. Also, the polymer composition may contain, in addition to the polymer (A), a rubber component different from the polymer (A) (hereinafter, also referred to as "another rubber component") as long as the effect of this disclosure is not impaired. The type of such another rubber component is not particularly limited, and examples thereof may include butadiene rubber (BR; for example, high-cis BR having 90% or more of cis-1,4 bonds, syndiotactic-1,2-polybutadiene (SPB)-containing BR, and the like), styrene butadiene rubber (SBR), natural rubber (NR), isoprene rubber (IR), styrene isoprene copolymer rubber, butadiene isoprene copolymer rubber, halogenated rubber, and the like. More preferably, another rubber component is at least one selected from the group consisting of NR, BR, and SBR. The blending ratio of another rubber component is preferably 80% by mass or less, and more preferably 50% by mass or less, relative to the total amount of the rubber component (polymer (A) and another rubber component) contained in the polymer composition.

—Inorganic Filler

As the inorganic filler, various reinforcing fillers, such as carbon black, silica, clay, and calcium carbonate, can be used. Preferably, carbon black, silica, or a combination of carbon black and silica is used. Silica is preferable from the viewpoint of obtaining a static ratio and good low hysteresis loss properties, and carbon black is preferable from the viewpoint of the strength of the polymer composition and the vulcanized rubber. Examples of silica include wet silica (hydrous silicic acid), dry silica (silicic anhydride), colloidal silica, and the like, and among them, wet silica is preferable. Examples of carbon black include furnace black, acetylene black, thermal black, channel black, graphite and the like, and among them, furnace black is preferable.

In the polymer composition according to this disclosure, the ratio of the inorganic filler (the total amount when two or more types are contained) to 100 parts by mass of the rubber component included in the polymer composition is 40 to 150 parts by mass. If the blending ratio of the inorganic filler is less than 40 parts by mass, the effect of improving the strength and the low temperature properties of the vulcanized rubber is not sufficient, and if the blending ratio exceeds 150 parts by mass, the wear resistance of the vulcanized rubber deteriorates. The blending ratio of the inorganic filler in the polymer composition is preferably 50 parts by mass or more, and more preferably 55 parts by mass or more relative to 100 parts by mass of the total amount of the rubber component. Further, the blending ratio of the inorganic filler is preferably 150 parts by mass or less, and more preferably 140 parts by mass or less, relative to 100 parts by mass of the total amount of the rubber component.

—Cross-Linking Agent

The type of the cross-linking agent contained in the polymer composition according to this disclosure is not particularly limited. Specific examples of the cross-linking agent include organic peroxides, phenol resins, sulfur, sulfur compounds, p-quinones, derivatives of p-quinone dioximes, bismaleimide compounds, epoxy compounds, silane compounds, amino resins, polyols, polyamines, triazine compounds, metal soaps, and the like. Of these, at least one selected from the group consisting of organic peroxides, phenol resins, and sulfur is preferable. One type of the cross-linking agent may be used alone, or two or more types may be used in combination.

Examples of the organic peroxide include 1,3-bis(t-butylperoxyisopropyl)benzene, 2,5-dimethyl-2,5-bis(t-butylperoxy)hexyne-3, 2,5-dimethyl-2,5-bis(t-butylperoxy)hexene-3,2,5-dimethyl-2,5-bis(t-butylperoxy)hexane, 2,2'-bis(t-butylperoxy)-p-isopropylbenzene, dicumyl peroxide, di-t-butyl peroxide, and t-butyl peroxide.

Examples of the phenolic resin include p-substituted phenolic compounds represented by formula (8), o-substituted phenol-aldehyde condensates, m-substituted phenol-aldehyde condensates, and brominated alkylphenol-aldehyde condensates. Of these, p-substituted phenolic compounds are preferred.

[F5]

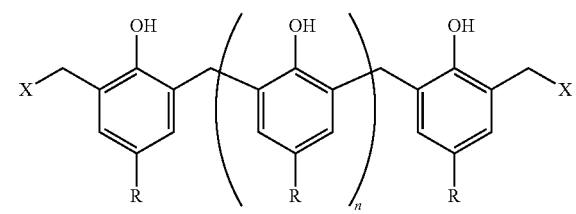

(8)

In formula (8), X represents a hydroxyl group, a halogenated alkyl group, or a halogen atom; R represents a C1 to C15 monovalent saturated hydrocarbon group; and n is an integer of 0 to 10. The p-substituted phenolic compound can be prepared through condensation reaction between p-substituted phenol and an aldehyde (preferably formaldehyde) in the presence of an alkali catalyst.

Examples of commercially available phenolic resins include product name "Tackirol 201" (alkylphenol-formaldehyde resin, manufactured by Taoka Chemical Company, Limited), product name "Tackirol 250-I" (brominated alkylphenol-formaldehyde resin (percent bromination: 4%), manufactured by Taoka Chemical Company, Limited), product name "Tackirol 250-111" (brominated alkylphenol-formaldehyde resin, manufactured by Taoka Chemical Company, Limited), product name "PR-4507" (manufactured by Gun Ei Chemical Industry Co., Ltd.), product name "ST137X" (manufactured by Rohm & Haas Company), product name "Sumilite Resin PR-22193" (manufactured by Sumitomo Durez Co., Ltd.), product name "Tamanol 531" (manufactured by Arakawa Chemical Industries, Ltd.), product name "SP1059," product name "SP1045," product name "SP1055," and product name "SP1056" (manufactured by Schenectady), and product name "CRM-0803" (manufactured by Showa Union Gosei Co., Ltd.). Of these, "Tackirol 201" is preferably used.

The amount of the crosslinking agent is preferably 0.01 to 20 parts by mass, more preferably 0.1 to 15 parts by mass, still more preferably 0.5 to 10 parts by mass, relative to 100 parts by mass of the total amount of the rubber components contained in the polymer composition.

—Other Components

The polymer composition according to this disclosure may contain a resin component together with the rubber component. The type of the resin component is not particularly limited, and examples thereof include polyolefin resins such as polyethylene and polypropylene. The blending ratio of the resin component is preferably 1 to 50 parts by mass, and more preferably 5 to 40 parts by mass, relative to 100 parts by mass of the total amount of the rubber component included in the polymer composition.

In addition to the above-described component, the polymer composition according to this disclosure may also contain various additives generally used in rubber compositions for obtaining vulcanized rubber for various purposes, such as for tires, hoses, anti-vibration, and belts. Examples of these additives include an antioxidant, zinc oxide, stearic acid, a softening agent, sulfur, a vulcanization accelerator, and the like. The blending ratios of these components can be appropriately selected depending on the type of additive as long as the effect of this disclosure is not impaired.

(Crosslinking Step)

The cross-linked product of this disclosure can be obtained through a crosslinking treatment of the above-described polymer composition. When obtaining a rubber molded product as a cross-linked product, usually, the polymer composition is molded into a predetermined shape and then subjected to a crosslinking treatment. The rubber molded product can be produced according to a conventional method. For example, in the production of a tire, the above-described polymer composition is mixed using a mixing machine such as a roll or a mixer, and molded into a predetermined shape. The obtained molded body is placed on an outer side according to a conventional method, vulcanized and molded to form one or both of the tread and the sidewall, thereby obtaining a pneumatic tire.

The cross-linked product of this disclosure exhibits excellent flexibility at low temperature because it has a glass transition point (Tg) of −25° C. or lower. From the viewpoint of obtaining a cross-linked product having even better flexibility at low temperature while maintaining high material strength, the glass transition point of the cross-linked product is preferably −35° C. or lower, more preferably −40° C. or lower, and further preferably −45° C. or lower. The glass transition point of the cross-linked product is the temperature at which tan δ is at a maximum when viscoelasticity is measured at a shear strain of 0.07% and an angular velocity of 100 radians per second.

Since the cross-linked product (vulcanized rubber) of this disclosure has high strength and excellent low temperature properties, it can be applied to various rubber molded products. Specifically, it can be applied to materials for tire treads and sidewalls; rolls and anti-vibration rubbers for industrial machinery, equipment, and the like; diaphragms, various hoses such as radiator hoses and air hoses as well as hose covers; seals such as packing, gaskets, weather strips, O-rings and oil seals; belts such as power transmission belts; and materials for linings, dust boots, wire harnesses, shoe soles, and the like. Among these, the cross-linked product is suitably applied to a tire member, an anti-vibration member, a belt member, a roll member, a hose member, a wire harness member, and a shoe sole member, and more suitably applied to a tire member, an anti-vibration member, a roll member, and a belt member.

In addition, cross-linked product of this disclosure is particularly suitable for a tire member because it has excellent fuel efficiency in addition to strength and low temperature properties. Among tire members, it is particularly suitable for winter tires and all-season tires. Further, the cross-linked product has excellent ozone resistance, and is also suitable as a material for a location susceptible to UV rays (for example, a tire sidewall).

EXAMPLES

The following will specifically describe this disclosure based on examples, but this disclosure is not limited to these examples. Unless otherwise specified, the word "part(s)" and the symbol "%" described in the examples and comparative examples refer to "part(s) by mass" and "% by mass", respectively. The methods for measuring the various physical property values of the polymer are now shown below.

[Bonded styrene content (% by mass): Measured by $^1$H-NMR at 400 MHz.

[Vinyl bond content (mol %)]: Measured by $^1$H-NMR at 400 MHz.

[First peak weight average molecular weight]: Determined in terms of polystyrene from the retention time corresponding to the apex of the maximum peak of a GPC curve obtained by gel permeation chromatography (GPC) (HLC-8120GPC (product name (manufactured by Tosoh Corporation)).

(GPC Conditions)

Columns: 2 columns, product name "GMHXL" (manufactured by Tosoh Corporation)
Column temperature: 40° C.
Mobile phase: tetrahydrofuran
Flow rate: 1.0 ml/min
Sample concentration: 10 mg/20 ml

[Glass transition temperature Tg (° C.)]: Measured by differential scanning calorimetry (DSC) in accordance with ASTM D3418.

[Melting point Tm (° C.) and heat of fusion ΔH (J/g)]:
Determined from a melting curve obtained by performing measurement using a DSC (product name "DSC 250", manufactured by TA Instruments Inc.). The measurement sample was prepared by enclosing 10 mg of the polymer in aluminum sample pans (model numbers "900786.901" and "900779.901", manufactured by TA Instruments Japan Inc.). The measurement was carried out by heating the measurement sample from room temperature to 180° C., holding at 180° C. for 1 minute, cooling to −100° C. at a rate of 10° C./min, then holding at −100° C. for 1 minute, and raising the temperature to 200° C. at a rate of 20° C./min. The total amount of heat absorbed due to crystal melting in the step of raising the temperature from −100° C. to 200° C. was defined as the heat of fusion (J/g), and the temperature at which the amount of heat absorbed peaked (° C.) was defined as the melting point. [Hydrogenation ratio (%)] and [α]: Determined by $^1$H-NMR at 400 MHz.

<Production of Highly Saturated Diene Polymer>
<Production of Hydrogenation Catalyst>

Production Example 1: Synthesis of Catalyst E

A three-necked flask (volume: 1 L) equipped with a stirrer and a dropping funnel was purged with dry nitrogen, and charged with 200 ml of anhydrous tetrahydrofuran and 0.2 mol of tetrahydrofurfuryl alcohol. Then, an n-butyllithium/cyclohexane solution (0.2 mol) was added dropwise to the three-necked flask at 15° C. to carry out a reaction, thereby obtaining a solution of tetrahydrofurfuryloxylithium in tetrahydrofuran.

Next, a three-necked flask (volume: 1 L) equipped with a stirrer and a dropping funnel was purged with dry nitrogen, and charged with 49.8 g (0.2 mol) of bis(η5-cyclopentadienyl)titanium dichloride and 250 ml of anhydrous tetrahydrofuran. Then, the solution of tetrafurfuryloxylithium in tetrahydrofuran obtained by the method described above was added dropwise for about 1 hour while stirring at room temperature. After about 2 hours, a reddish brown liquid was removed by filtration and the insoluble portion was washed with dichloromethane.

Then, the solvent in the filtrate and in the washing solution was removed under reduced pressure to obtain a catalyst E [bis(η5-cyclopentadienyl)titanium (tetrahydrofurfuryloxy)chloride] ("[chlorobis(2,4-cyclopentadienyl)titanium(IV) tetrahydrofurfuryl alkoxide]"). The yield was 95%.

<Production of Conjugated Diene-Based Rubber>

Production Example 2: Synthesis of Conjugated Diene-Based Rubber P1

An autoclave reaction vessel that had been purged with nitrogen and had an internal volume of 50 liters was charged with 25900 g of cyclohexane, 91 g of tetrahydrofuran, 370 g of styrene, and 3219 g of 1,3-butadiene. The temperature of the contents of the reaction vessel was adjusted to 35° C., and then a cyclohexane solution including n-butyllithium (39 mmol) was added to initiate polymerization. The polymerization was carried out under adiabatic conditions, and the maximum temperature reached 85° C.

After it had been confirmed that the polymerization conversion rate had reached 99%, 111 g of butadiene was added, and polymerization was carried out for a further 5 minutes to obtain a reaction solution including a polymer. The obtained reaction solution was charged with 2 mmol of silicon tetrachloride, the reaction was carried out for 10 minutes, then 28 mmol of N,N-dimethyl-3-(triethoxysilyl)propylamine was added, and the reaction was carried out for a further 20 minutes.

The obtained polymer solution containing a conjugated diene-based copolymer was charged with 7.4 g of 2,6-di-tert-butyl-p-cresol. Next, an aqueous solution (temperature: 80° C.) adjusted to pH 8.5 (pH at 80° C. according to a glass electrode method) with ammonia, which is a pH adjuster, was placed in a desolvation tank, the above polymer solution was further added (in a ratio of 200 parts by mass of the aqueous solution to 100 parts by mass of the polymer solution), desolvation was performed by steam stripping (steam temperature: 190° C.) for 2 hours at a temperature of 95° C. of the liquid phase of the desolvation tank, and drying was carried out using a heat roll adjusted to 110° C. to obtain a conjugated diene-based rubber P1. The analytical values of the obtained conjugated diene-based rubber P1 are shown in Table 2 below.

Production Example 3: Synthesis of Conjugated Diene-Based Rubber P2

An autoclave reaction vessel that had been purged with nitrogen and had an internal volume of 50 liters was charged with 25900 g of cyclohexane, 130 g of tetrahydrofuran, 370 g of styrene, and 3219 g of 1,3-butadiene. The temperature of the contents of the reaction vessel was adjusted to 35° C., and then a cyclohexane solution including n-butyllithium (39 mmol) was added to initiate polymerization. The polymerization was carried out under adiabatic conditions, and the maximum temperature reached 85° C.

After it had been confirmed that the polymerization conversion rate had reached 99%, 111 g of butadiene was added, and polymerization was carried out for a further 5 minutes to obtain a reaction solution including a polymer. The obtained reaction solution was charged with 2 mmol of tetrachlorosilane, the reaction was carried out for 10 minutes, then 28 mmol of N,N-dimethyl-3-(triethoxysilyl)propylamine was further added, and the reaction was carried out for a 20 minutes.

Next, the temperature of the system was raised to 80° C. or higher, hydrogen was introduced into the system, and then 0.32 g of the catalyst E and 0.39 g of tetrachlorosilane were added. A reaction was carried out by supplying hydrogen so that the hydrogen pressure was maintained at 0.7 MPa or higher and a predetermined integrated hydrogen value was obtained. The reaction solution was then returned to normal temperature and pressure, and extracted from the reaction vessel to obtain a polymer solution.

The obtained polymer solution containing a hydrogenated conjugated diene-based copolymer was charged with 7.4 g of 2,6-di-tert-butyl-p-cresol. Next, an aqueous solution (temperature: 80° C.) adjusted to pH 8.5 (pH at 80° C. according to a glass electrode method) with ammonia, which is a pH adjuster, was placed in a desolvation tank, the above polymer solution was further added (in a ratio of 200 parts by mass of the aqueous solution to 100 parts by mass of the polymer solution), desolvation was performed by steam stripping (steam temperature: 190° C.) for 2 hours at a temperature of 95° C. of the liquid phase of the desolvation tank, and drying was carried out using a heat roll adjusted to 110° C. to obtain a conjugated diene-based rubber P2. The analytical values of the obtained conjugated diene-based rubber P2 are shown in Table 1 below.

Production Examples 4 to 6: Synthesis of Conjugated Diene-Based Rubbers P3, P4, and P6 to P14

Conjugated diene-based rubbers P3, P4, and P6 to P14 were each obtained by performing the same operation as in Production Example 3, except that the raw materials used were changed as shown in Table 1 and the hydrogenation time was changed. The analytical values of the conjugated diene-based rubbers P3, P4, and P6 to P14 are shown in Table 2.

Production Example 7: Synthesis of Conjugated Diene-Based Rubber P5

A hydrogenated conjugated diene-based rubber P5 was obtained by performing the same operation as in Production Example 3, except that 39 mmol of n-butyllithium and 27 mmol of piperidine were used instead of using n-butyllithium. The analytical values of the conjugated diene-based rubber P5 are shown in Table 2.

TABLE 1

| | | Type of polymer | | | | | | |
|---|---|---|---|---|---|---|---|---|
| | | P1 | P2 | P3 | P4 | P5 | P6 | P7 |
| Polymerization formulation Solvent | | | | | | | | |
| Cyclohexane | (g) | 25900 | 25900 | 25900 | 25900 | 25900 | 25900 | 25900 |
| Vinyl-content adjusting agent | | | | | | | | |
| Tetrahydrofuran | (g) | 91 | 130 | 91 | 130 | 91 | 67 | 67 |
| Monomer | | | | | | | | |
| Styrene | (g) | 370 | 370 | 370 | 370 | 370 | 1258 | 740 |
| Butadiene | (g) | 3219 | 3219 | 3219 | 3219 | 3219 | 2331 | 2894 |
| Additional butadiene | (g) | 111 | 111 | 111 | 111 | 111 | 111 | 111 |
| Polymerization initiator | | | | | | | | |
| n-butyllithium | (mmol) | 39 | 39 | 39 | 39 | 39 | 39 | 39 |
| Compound A | (mmol) | — | — | — | — | 27 | — | — |
| Amine-based modifier | | | | | | | | |
| Compound B | (mmol) | 28 | 28 | 28 | 28 | 28 | 28 | 28 |
| Coupling agent | | | | | | | | |
| Compound C | (mmol) | 2 | 2 | 2 | 2 | 2 | 2 | 2 |

| | | Type of polymer | | | | | | |
|---|---|---|---|---|---|---|---|---|
| | | P8 | P9 | P10 | P11 | P12 | P13 | P14 |
| Polymerization formulation Solvent | | | | | | | | |
| Cyclohexane | (g) | 25900 | 25900 | 25900 | 25900 | 25900 | 25900 | 25900 |
| Vinyl-content adjusting agent | | | | | | | | |
| Tetrahydrofuran | (g) | 67 | 67 | 28 | 28 | 18 | 2 | 67 |
| Monomer | | | | | | | | |
| Styrene | (g) | 740 | 370 | 370 | 370 | 370 | 185 | 370 |
| Butadiene | (g) | 2894 | 3219 | 3219 | 3219 | 3219 | 3404 | 3219 |
| Additional butadiene | (g) | 111 | 111 | 111 | 111 | 111 | 111 | 111 |
| Polymerization initiator | | | | | | | | |
| n-butyllithium | (mmol) | 39 | 39 | 39 | 39 | 39 | 39 | 39 |
| Compound A | (mmol) | — | — | — | — | — | — | — |
| Amine-based modifier | | | | | | | | |
| Compound B | (mmol) | 28 | 28 | 28 | 28 | 28 | 28 | 28 |
| Coupling agent | | | | | | | | |
| Compound C | (mmol) | 2 | 2 | 2 | 2 | 2 | 2 | 2 |

TABLE 2

| | Type of polymer | | | | | | |
|---|---|---|---|---|---|---|---|
| | P1 | P2 | P3 | P4 | P5 | P6 | P7 |
| Bonded styrene content (wt %) | 10 | 10 | 10 | 10 | 10 | 34 | 20 |
| Vinyl bond content (mol %) | 41 | 47 | 41 | 49 | 40 | 36 | 35 |
| Initiation modifier | — | — | — | — | A | — | — |
| Terminal modifier | B | B | B | B | B | B | B |
| First peak weight average molecular weight ($\times 10^4$) | 20 | 18 | 20 | 19 | 20 | 19 | 20 |
| Polymer Tg (° C.) | −60 | −53 | −52 | −52 | −52 | −32 | −48 |
| Hydrogenation ratio (%) | 0 | 85 | 92 | 95 | 92 | 95 | 93 |
| α | 0 | 0.85 | 0.92 | 0.95 | 0.92 | 0.95 | 0.93 |
| ΔH (J/g) | 0 | 3 | 5 | 4 | 5 | 2 | 7 |
| Tm (° C.) | undetected | −9 | −1 | 4 | −1 | 21 | 3 |

| | Type of polymer | | | | | |
|---|---|---|---|---|---|---|
| | P8 | P9 | P10 | P11 | P12 | P13 | P14 |
| Bonded styrene content (wt %) | 20 | 10 | 10 | 10 | 10 | 5 | 10 |
| Vinyl bond content (mol %) | 35 | 35 | 28 | 28 | 23 | 14 | 35 |

TABLE 2-continued

| | | | | | | | |
|---|---|---|---|---|---|---|---|
| Initiation modifier | — | — | — | — | — | — | — |
| Terminal modifier | B | B | B | B | B | B | B |
| First peak weight average molecular weight (×10⁴) | 22 | 22 | 22 | 21 | 21 | 20 | 21 |
| Polymer Tg (° C.) | −50 | −52 | −51 | −60 | −58 | −56 | −60 |
| Hydrogenation ratio (%) | 85 | 94 | 91 | 83 | 81 | 91 | 73 |
| α | 0.85 | 0.91 | 0.91 | 0.81 | 0.82 | 0.95 | 0.76 |
| ΔH (J/g) | 4 | 20 | 27 | 20 | 22 | 60 | 4 |
| Tm (° C.) | −1 | 10 | 31 | 7 | 20 | 65 | −14 |

In Tables 1 and 2, the abbreviations of the compounds represent the following compounds.
Compound A: Piperidine
Compound B: N,N-dimethyl-3-(triethoxysilyl)propylamine
Compound C: Tetrachlorosilane
In Tables 1 and 2, "-" indicates that the compound of the corresponding column was not used.

<Production of Rubber Composition and Evaluation of Properties Thereof>

Examples 1 to 12 and Comparative Examples 1 to 3

Using a plastomill (internal capacity: 250 cc) equipped with a temperature control device, a first stage of kneading was carried out by mixing and kneading the hydrogenated or unhydrogenated conjugated diene-based rubber, silica, a silane coupling agent, extender oil, stearic acid, zinc oxide, and an antioxidant in the blending formulations of the following Table 3 under conditions of a filling rate of 72% and a rotation speed of 60 rpm. Next, as a second stage of kneading, the formulation obtained above was cooled to room temperature, then sulfur and a vulcanization accelerator were added, and the mixture was kneaded. The kneaded product was molded, and vulcanized at 160° C. for a predetermined time with a vulcanization press. The following properties (1) to (6) were evaluated using the rubber composition, the pre-vulcanization rubber, and the vulcanized rubber. The types and ratios of the conjugated diene-based rubber used in each of the examples and comparative examples are as shown in the following Table 4. The numerical values in the "Polymer" column of Table 4 represent the blending ratio of each polymer relative to a total of 100 parts by mass of the conjugated diene-based rubber used in the blending of the rubber composition.

TABLE 3

| Formulation (phr) | |
|---|---|
| Conjugated diene-based rubber | 100 |
| Silica *1) | 75 |
| Silane coupling agent *2) | 6.0 |
| Extender oil *3) | 34 |
| Stearic acid | 2.0 |
| Zinc oxide | 3.0 |
| Antioxidant *4) | 1.0 |
| Vulcanization accelerator CZ *5) | 1.8 |
| Vulcanization accelerator D *6) | 1.5 |
| Sulfur | 1.5 |

*1) ZEOSIL 1165MP, manufactured by Rhodia
*2) Si75, manufactured by Evonik
*3) Process Oil T-DAE, manufactured by ENEOS Corporation
*4) Ozonone 6C, manufactured by Seiko Chemical Co., Ltd.
*5) Nocceler CZ, manufactured by Ouchi Shinko Chemical Industrial Co., Ltd.
*6) Nocceler D, manufactured by Ouchi Shinko Chemical Industrial Co., Ltd.

Evaluation of Properties (1) Break Strength
The tensile strength (TB) at the time of cutting was measured in accordance with JIS K6251: 2010 using a vulcanized rubber as a measurement sample. The measurement result shows that the larger the numerical value, the higher (better) the tensile strength (break strength).

(2) Elastic Modulus at −20° C.
The elastic modulus was measured under conditions of a shear strain of 0.14%, an angular velocity of 100 radians per second, and −20° C. using an ARES-RDA (manufactured by TA Instruments) with a rubber before vulcanization as the measurement sample. The smaller the numerical value, the higher the flexibility in a low temperature environment (−20° C.) and the better the low temperature properties.

(3) Low Hysteresis Loss Properties (50° C. tan δ)
The loss coefficient (tan δ (50° C.)) was measured under conditions of a shear strain of 0.7%, an angular velocity of 100 radians per second, and 50° C. using an ARES-RDA (manufactured by TA Instruments) with a vulcanized rubber as the measurement sample. The result is shown as an index with Comparative Example 1 as 100, and the larger the numerical value, the smaller the energy loss and the better the low hysteresis loss properties (fuel efficiency) are.

(4) Ozone Resistance
A static ozone deterioration test was conducted by exposing a vulcanized rubber as the measurement sample to ozone for 72 hours in accordance with method A of JIS K6257-1: 2015 10.2. The results were ranked as follows.

<Ranking by Number of Cracks>
  A: A small number of cracks
  B: Many cracks
  C: Countless cracks <Ranking by Crack Size and Depth>
  1: Cracks that cannot be seen with the naked eye but can be confirmed with a 10× magnifying glass
  2: Cracks that can be confirmed with the naked eye
  3: Deep and relatively large cracks (less than 1 mm)
  4: Deep and large cracks (1 mm or more and less than 3 mm)
  5: Cracks that are 3 mm or more or cracks that are likely to cleavage In Table 4, for example, the notation "A-4" indicates that the ranking based on the number of cracks is "A" and the ranking based on the size and depth of cracks is "4".

(5) Glass Transition Point (Tg)
The viscoelasticity was measured at a shear strain of 0.07% and an angular velocity of 100 radians per second using a vulcanized rubber as the measurement sample, and the temperature at which tan δ was at a maximum was taken as the glass transition point.

(6) Green Strength
An unvulcanized rubber was punched into a No. 3 dumbbell in accordance with JIS K6251: 2017 to obtain a test piece, and the tensile strength was measured at room temperature and a tensile speed of 200 mm/min. The value obtained in Comparative Example 1 was standardized as 100, and evaluation was carried out based on the following ranking.

Ranking of Green Strength
  A: More than 130
  B: More than 110 and 130 or less
  C: 110 or less The results of the evaluation of the properties of Examples 1 to 12 and Comparative Examples 1 to 3 are shown in Table 4 below.

poor flexibility at low temperature. The vulcanized rubber produced using a polymer having a low hydrogenation ratio (Comparative Example 3) had a low break strength and a low green strength, like in Comparative Example 1.

In contrast, the rubber compositions of Examples 1 to 12 exhibited better values for both strength and elastic modulus at −20° C. than Comparative Example 1. Further, when the rubber compositions of Examples 1 to 12 are compared with that of Comparative Example 2, the elastic modulus of the rubber compositions of Examples 1 to 12 at −20° C., that is, the flexibility at low temperature, was greatly improved. In

TABLE 4

| | | Examples | | | | | | | |
|---|---|---|---|---|---|---|---|---|---|
| | | 1 | 2 | 3 | 4 | 5 | 6 | 7 | 8 |
| Polymer | Conjugated diene-based rubber P1 | — | — | — | — | 20 | — | — | — |
| | Conjugated diene-based rubber P2 | 100 | — | — | — | — | — | — | — |
| | Conjugated diene-based rubber P3 | — | 100 | — | — | 80 | — | — | — |
| | Conjugated diene-based rubber P4 | — | — | 100 | — | — | — | — | — |
| | Conjugated diene-based rubber P5 | — | — | — | 100 | — | — | — | — |
| | Conjugated diene-based rubber P6 | — | — | — | — | — | — | — | — |
| | Conjugated diene-based rubber P7 | — | — | — | — | — | 100 | — | — |
| | Conjugated diene-based rubber P8 | — | — | — | — | — | — | 100 | — |
| | Conjugated diene-based rubber P9 | — | — | — | — | — | — | — | 100 |
| | Conjugated diene-based rubber P10 | — | — | — | — | — | — | — | — |
| | Conjugated diene-based rubber P11 | — | — | — | — | — | — | — | — |
| | Conjugated diene-based rubber P12 | — | — | — | — | — | — | — | — |
| | Conjugated diene-based rubber P13 | — | — | — | — | — | — | — | — |
| | Conjugated diene-based rubber P14 | — | — | — | — | — | — | — | — |
| Physical properties | Break strength (MPa) | 22 | 28 | 25 | 28 | 23 | 26 | 24 | 24 |
| | Elastic modulus G' (−20° C.) (MPa) | 6 | 8 | 7 | 8 | 8 | 9 | 9 | 9 |
| | Low hysteresis loss properties | 155 | 132 | 110 | 140 | 113 | 113 | 130 | 111 |
| | Ozone resistance (72 h) | A-4 | A-3 | A-3 | A-3 | B-4 | A-3 | A-4 | A-3 |
| | Vulcanized rubber Tg (° C.) | −36 | −34 | −34 | −34 | −35 | −32 | −32 | −33 |
| | Green strength | B | B | B | B | B | B | B | A |

| | | Examples | | | | Comparative Examples | | |
|---|---|---|---|---|---|---|---|---|
| | | 9 | 10 | 11 | 12 | 1 | 2 | 3 |
| Polymer | Conjugated diene-based rubber P1 | — | — | — | — | 100 | — | — |
| | Conjugated diene-based rubber P2 | — | — | — | — | — | — | — |
| | Conjugated diene-based rubber P3 | — | — | — | — | — | — | — |
| | Conjugated diene-based rubber P4 | — | — | — | — | — | — | — |
| | Conjugated diene-based rubber P5 | — | — | — | — | — | — | — |
| | Conjugated diene-based rubber P6 | — | — | — | — | — | 100 | — |
| | Conjugated diene-based rubber P7 | — | — | — | — | — | — | — |
| | Conjugated diene-based rubber P8 | — | — | — | — | — | — | — |
| | Conjugated diene-based rubber P9 | — | — | — | — | — | — | — |
| | Conjugated diene-based rubber P10 | 100 | — | — | — | — | — | — |
| | Conjugated diene-based rubber P11 | — | 100 | — | — | — | — | — |
| | Conjugated diene-based rubber P12 | — | — | 100 | — | — | — | — |
| | Conjugated diene-based rubber P13 | — | — | — | 100 | — | — | — |
| | Conjugated diene-based rubber P14 | — | — | — | — | — | — | 100 |
| Physical properties | Break strength (MPa) | 29 | 25 | 22 | 26 | 20 | 28 | 20 |
| | Elastic modulus G' (−20° C.) (MPa) | 8 | 3 | 4 | 9 | 11 | 54 | 8 |
| | Low hysteresis loss properties | 113 | 132 | 131 | 140 | 100 | 98 | 115 |
| | Ozone resistance (72 h) | A-3 | A-4 | A-4 | A-3 | C-4 | A-2 | A-4 |
| | Vulcanized rubber Tg (° C.) | −33 | −40 | −40 | −40 | −41 | −20 | −40 |
| | Green strength | A | B | A | A | C | A | C |

As shown in Table 4, the vulcanized rubber using an unhydrogenated polymer (Comparative Example 1) had the lowest break strength, and its strength was not sufficient. Further, the elastic modulus at −20° C. was also slightly high. In addition, the polymer (conjugated diene-based rubber P1) used for producing the vulcanized rubber of Comparative Example 1 did not have a heat of fusion, and the green strength of the vulcanized rubber was low. The vulcanized rubber having a glass transition point of −20° C. (Comparative Example 2) had a high tensile strength (TB) value but a large elastic modulus value at −20° C., and had addition, the conjugated diene-based rubbers P2 to P5 and P7 to P13 had crystallinity from the heat of fusion and the melting point, and the rubber compositions of Examples 1 to 12 containing the conjugated diene-based rubbers P2 to P5 and P7 to P13 had a high green strength. From these results, it was found that according to the rubber compositions of Examples 1 to 12, a cross-linked product having improved processability could be obtained.

From the above results, it was found that by crosslinking a rubber composition containing a highly saturated conjugated diene-based polymer and an inorganic filler in a predetermined ratio, a vulcanized rubber having a sufficiently low glass transition point could be obtained, and further, a vulcanized rubber having high strength and excellent flexibility at low temperature can be obtained. Further, the vulcanized rubbers of Examples 1 to 12 had better ozone resistance, low hysteresis loss properties (fuel efficiency) and green strength than the vulcanized rubber of Comparative Example 1, and had better low hysteresis loss properties (fuel efficiency) than the vulcanized rubber of Comparative Example 2. In addition, the vulcanized rubbers of Examples 1 to 12 had better green strength than the vulcanized rubber of Comparative Example 3.

The invention claimed is:

1. A cross-linked product, obtained by a process comprising crosslinking a polymer composition that comprises a rubber component, an inorganic filler, and a cross-linking agent,
wherein the rubber component comprises a conjugated diene-based polymer (A) having a value α in a range of from 0.80 to 0.97, where a is calculated by formula (i);

$$\alpha=(p+(0.5\times r))/(p+q+(0.5\times r)+s) \quad (i),$$

p is a molar ratio of a structural unit of formula (1);

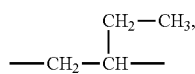

(1)

q is a molar ratio of a structural unit of formula (2);

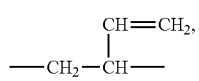

(2)

r is a molar ratio of a structural unit of formula (3);

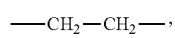

(3)

and
s is a molar ratio of a structural unit of formula (4);

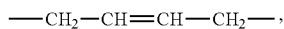

(4)

in the conjugated diene-based polymer (A),
wherein a blending ratio of the conjugated diene-based polymer (A) is 10% by mass or more, relative to a total amount of the rubber component,
wherein a blending ratio of the inorganic filler is in a range of from 50 to 150 parts by mass, relative to 100 parts by mass of the rubber component,
wherein the cross-linked product has a glass transition point, Tg, of −25° C. or lower,
wherein the conjugated diene-based polymer (A) is a random copolymer of a conjugated diene compound and an aromatic vinyl compound,
wherein the conjugated diene-based polymer (A) has a content ratio of a structural unit derived from the aromatic vinyl compound in a range of from 3 to 20% by mass, relative to a total monomer unit amount of the conjugated diene-based polymer, and
wherein the conjugated diene-based polymer (A) has a 1,2-vinyl bond content in a range of from 5 to 28 mol % before hydrogenation.

2. The cross-linked product of claim 1, wherein the conjugated diene-based polymer (A) has a functional group that interacts with the inorganic filler.

3. The cross-linked product of claim 1, wherein the conjugated diene-based polymer (A) has a Tg of −45° C. or lower.

4. The cross-linked product of claim 1, wherein the conjugated diene-based polymer (A) has a melting point of −10° C. or higher, and a heat of fusion of 3 J/g or more, when measured with a differential scanning calorimeter by raising the temperature from −100° C. to 200° C. at 20° C./min.

5. A method for producing a cross-linked product, the method comprising:
crosslinking a polymer composition that comprises a rubber component, an inorganic filler, and a cross-linking agent,
wherein the rubber component comprises a conjugated diene-based polymer (A) having a value α in a range of from 0.80 to 0.97, where a is calculated by formula (i):

$$\alpha=(p+(0.5\times r)/(p+q+(0.5\times r)+s) \quad (i),$$

p is a molar ratio of a structural unit of formula (1);

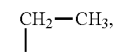

(1)

q is a molar ratio of a structural unit of formula (2);

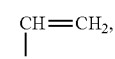

(2)

r is a molar ratio of a structural unit of formula (3);

(3)

and
s is a molar ratio of a structural unit of formula (4):

(4)

in the conjugated diene-based polymer (A),
wherein a blending ratio of the conjugated diene-based polymer (A) is 10% by mass or more relative to a total amount of the rubber component,
wherein a blending ratio of the inorganic filler is in a range of from 50 to 150 parts by mass relative to 100 parts by mass of the rubber component,
wherein the cross-linked product has a glass transition point, Tg, of −25° C. or lower,
wherein the conjugated diene-based polymer (A) is a random copolymer of a conjugated diene compound and an aromatic vinyl compound, wherein the conjugated diene-based polymer (A) has a content ratio of a structural unit derived from the aromatic vinyl compound in a range of from 3 to 20% by mass relative to a total monomer unit amount of the conjugated diene-based polymer, and wherein the conjugated diene-based polymer (A) has a 1,2-vinyl bond content in a range of from 5 to 28 mol % before hydrogenation.

6. The method of claim 5, wherein the conjugated diene-based polymer (A) has a $T_g$ of −45° C. or lower.

7. An all-season tire, comprising:
a tread and/or a sidewall, comprising the cross-linked product of claim 1.

8. A winter tire, comprising:
a tread and/or a sidewall, comprising the cross-linked product of claim 1.

9. A rubber molded product, comprising:
the cross-linked product of claim 1,
wherein the rubber molded product is an anti-vibration member, a belt member, a roll member, a hose member, a wire harness member, or a shoe sole member.

10. The cross-linked product of claim 2, wherein the conjugated diene-based polymer (A) has a Tg of −45° C. or lower.

11. The cross-linked product of claim 2, wherein the conjugated diene-based polymer (A) has a melting point of −10° C. or higher, and a heat of fusion of 3 J/g or more, when measured with a differential scanning calorimeter by raising the temperature from −100° C. to 200° C. at 20° C./min.

12. The cross-linked product of claim 3, wherein the conjugated diene-based polymer (A) has a melting point of −10° C. or higher, and a heat of fusion of 3 J/g or more, when measured with a differential scanning calorimeter by raising the temperature from −100° C. to 200° C. at 20° C./min.

13. The cross-linked product of claim 1, wherein the content ratio of the structural unit derived from the aromatic vinyl compound is in a range of from 10 to 20% by mass, relative to the total monomer unit amount of the conjugated diene-based polymer.

14. The cross-linked product of claim 1, wherein the conjugated diene-based polymer (A) has a 1,2-vinyl bond content in a range of from 10 to 28 mol. % before hydrogenation.

15. The cross-linked product of claim 13, wherein the conjugated diene-based polymer (A) has a 1,2-vinyl bond content in a range of from 10 to 23 mol. % before hydrogenation.

16. The cross-linked product of claim 13, wherein the conjugated diene-based polymer (A) has a 1,2-vinyl bond content in a range of from 15 to 28 mol. % before hydrogenation.

17. The method of claim 5, wherein the content ratio of the structural unit derived from the aromatic vinyl compound is in a range from 10 to 20% by mass, relative to the total monomer unit amount of the conjugated diene-based polymer.

18. The method of claim 5, wherein the conjugated diene-based polymer (A) has a 1,2-vinyl bond content in a range of from 10 to 28 mol % before hydrogenation.

19. The method of claim 17, wherein the conjugated diene-based polymer (A) has a 1,2-vinyl bond content in a range of from 10 to 23 mol % before hydrogenation.

20. The method of claim 17, wherein the conjugated diene-based polymer (A) has a 1,2-vinyl bond content in a range of from 15 to 28 mol % before hydrogenation.

* * * * *